United States Patent
Wagensonner et al.

[11] 3,808,482
[45] Apr. 30, 1974

[54] MOTOR WITH SPEED CONTROL CIRCUIT

[75] Inventors: Eduard Wagensonner, Aschheim; Volkmar Stenzenberger, Unterhaching, both of Germany

[73] Assignee: Agfa-Gevaert Aktiengesellschaft, Leverkusen, Germany

[22] Filed: May 30, 1972

[21] Appl. No.: 258,032

[30] Foreign Application Priority Data
May 28, 1971  Germany............................ 2126548

[52] U.S. Cl................................ 318/317, 318/331
[51] Int. Cl............................................. H02p 5/16
[58] Field of Search............................ 318/317, 331

[56] References Cited
UNITED STATES PATENTS

| | | | |
|---|---|---|---|
| 3,412,305 | 11/1968 | Kanner | 318/331 |
| 3,447,055 | 5/1969 | Mason | 318/331 |
| 3,573,583 | 4/1971 | McCampbell | 318/317 |
| 3,629,633 | 12/1971 | O'Callaghan | 318/317 X |

*Primary Examiner*—B. Dobeck
*Attorney, Agent, or Firm*—Michael S. Striker

[57] ABSTRACT

A regulating arrangement comprises a subtracting amplifier having an output and two inputs, and producing at the output a voltage equal to a first factor times the voltage at one of the inputs minus a second factor times the voltage at the other of the inputs. A motor circuit is connected across the output of the subtracting amplifier. The motor circuit includes a motor connected with an impedance. The impedance is connected with the motor and with the output of the subtracting amplifier and enforces a voltage drop across the motor of magnitude differing from the voltage magnitude across the amplifier output by at least the magnitude of the voltage drop across the impedance. The voltage drop across the motor increases in magnitude as the motor current supplying energy to the motor decreases. Accordingly, the voltage drop across the motor tends to increase as the motor speed increases. A command unit applies to one of the inputs of the subtracting amplifier a voltage effecting desired motion of the motor. A feedback arrangement, connected with the motor and with the other input of the amplifier, applies to the latter at least part of the voltage drop across the motor.

13 Claims, 3 Drawing Figures

3,808,482

MOTOR WITH SPEED CONTROL CIRCUIT

BACKGROUND OF THE INVENTION

The invention relates to regulating arrangements. More particularly, the invention relates to regulating arrangements including a movable component whose motion is to be controlled and an electrical mover which moves the movable component in accordance with command signals applied to the mover. The electrical mover can be a conventional D.C. motor, a galvanometer-type mover, an electromechanical transducer of the sliding-core type, or any of a host of other well known electrical movers and transducers used in servo-mechanisms and other types of control systems.

The invention relates, inter alia, to extremely well known problems arising from the control of a movable component indirectly through an intermediate electrical mover. In many control systems the system response is far from the theoretical ideal, and the commanded performance is actually achieved only after an undesirable delay, or not at all, or only with undesired overshoots and oscillation, etc. It is known in the art to improve various aspects of system response by the use of such expedients as error-rate damping, integral error compensation, output-derivative feedback damping, and other expedients.

Tachometric feedback damping, for example, involves subtracting from the activating signal for the electrical motor a signal proportional to the speed of the electrical motor. The activating signal is proportional to the difference between the actual and desired values of a controlled variable, such as for instance the angular orientation of the rotor of the motor. The subtraction from the activating signal of the speed-proportional tachometer voltage results in damping of the system response, and in a decreased tendency to overshoot the desired final position. Details of tachometric feedback damping are well known, and reference is made for example to "Control Systems Engineering", by Del Toro and Parker, McGraw Hill, New York, 1960, pp. 132 ff.

An important practical disadvantage of tachometric feedback damping is the use of a tachometer generator for producing the feedback signal proportional to motor speed. Clearly, the tachometer generator adds to the cost of the system, may in some circumstances be bulky, and may be difficult to fit into a system already built and not having tachometric feedback damping.

SUMMARY OF THE INVENTION

It is accordingly a general object of the present invention to provide a regulating arrangement having improved system response.

It is a more particular object to provide a regulating arrangement whose electrical mover exhibits a reduced tendency to greatly overshoot the desired value of a controlled variable and then to oscillate about such value before actually settling upon it in the steady state.

It is a related object to provide a regulating arrangement whose performance is at least as satisfactory as that of the tachometric-feedback-damping type of regulating arrangement.

It is another object to provide a regulating arrangement in which is generated a damping feedback signal indicative of motor speed, but without requiring the use of a tachometer generator.

It is a further object to provide such an arrangement wherein the speed-dependent damping feedback signal is generated in a simple manner, using only very inexpensive and simple components.

It is still another object to provide such an arrangement whose response is damped in an extremely advantageous manner.

These and other objects of the invention can be met, for instance, by a regulating arrangement which includes subtracting amplifier means, having two inputs and an output, and producing at the output a voltage equal to a first factor times the voltage at one of its inputs minus a second factor times the voltage at the other of its inputs. The arrangement includes a motor circuit connected across the output of the subtracting amplifier, and includes a motor and an impedance connected with the motor and carrying at least part of the motor current. Such connection of the impedance enforces a voltage magnitude across the amplifier output by at least the magnitude of the voltage drop across the impedance. Thus, the voltage drop across the motor is constrained to increase in magnitude with decreasing motor current, and accordingly to increase in magnitude with increasing motor speed. Thus, the actual transient voltage across the motor can be used as a feedback signal indicative of the motor speed. The arrangement also includes command means for applying to one of the amplifier inputs a voltage effecting desired motion of the motor. Also, feedback means is connected with the motor and the other of the amplifier inputs, and applies to the latter at least part of the voltage drop across the motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
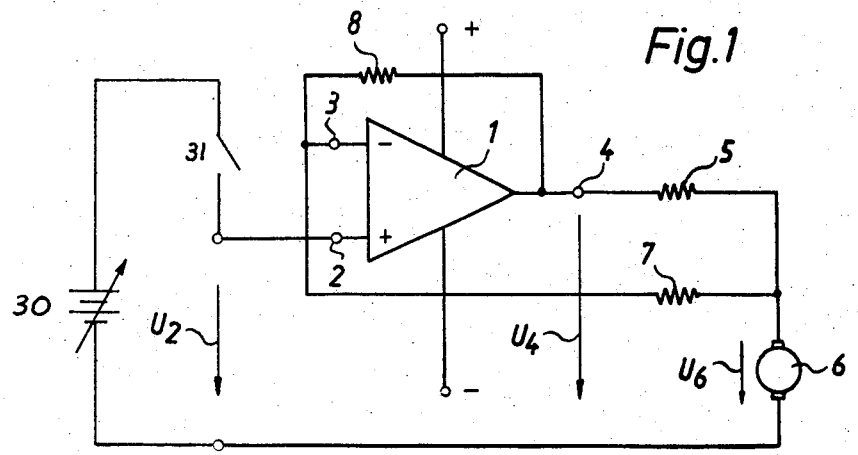
FIG. 1 is a circuit diagram of one embodiment according to the invention.

In FIG. 1, reference numeral 1 designates subtracting amplifier means according to the invention, here in the form of an operational amplifier having a differential input. In particular the operational amplifier includes a non-inverting input 2, an inverting input 3, an output 4 and a conventional feedback resistor 8 connecting the output 4 to the input 3. In FIG. 1 the subtracting amplifier 1 produces at its output 4 a voltage proportional to the difference between the voltages at inputs 2 and 3.

Connected across the output of subtracting amplifier 4 is a motor circuit including an impedance 5 and a motor 6. In the embodiment of FIG. 1 the motor 6 is a conventional D.C. rotary motor. The conductor connecting output 4 to resistor 5 forms means for driving the motor by applying the voltage at output 4 to the motor circuit.

Feedback means 7 is connected to the motor terminal to which is connected impedance 5, and is also connected to inverting input 3. As will be appreciated by those familiar with feedback networks, feedback resistor 7 will feed back to input 3 a voltage which is proportional to the voltage $U_6$ across motor 6. Command means 30, here schematically illustrated as an adjustable voltage source, is connected across the noninverting input of subtracting amplifier 1, and applies to input 3 a command voltage $U_2$ which effects desired motion of motor 6.

The operation of the FIG. 1 circuit will now be explained. For purposes of understanding, it will first be assumed that feedback resistor 7 is removed.

Initially, the motor 6 is at rest, and the voltage $U_6$ is equal to zero. The motor is started by closing switch 31. Closing of switch 31 establishes at input 2 a command voltage $U_2$. The appearance at input 2 of voltage $U_2$ produces at amplifier output 4 a voltage having the same polarity as voltage $U_2$. The voltage $U_4$ across the series connection of impedance 5 and motor 6 will serve as a driving voltage for the motor and will cause the speed of the motor to rise from zero.

While the motor is yet almost at a standstill, the voltage $U_6$ across the motor 6 will be a fraction of the driving voltage $U_4$ — namely, that fraction resulting from simple voltage division.

The voltage $U_4$, divided by the total resistance presented by resistor 5 plus motor 6, will largely determine the armature current through motor 6; for the sake of simplicity, it is assumed that most of the armature current will flow through resistor 5. The flow of armature current will produce an accelerating torque, and the speed of motor 6 will increase. As the motor speed tends to increase, the net voltage across resistor 5 plus motor 6 will decrease, because of the induced motor EMF. Accordingly, the magnitude of the armature current (assumed flowing in direction of arrow $U_6$) will tend to decrease. Since the armature current flows through resistor 5, the voltage across resistor 5 will also tend to decrease. However, since the voltage $U_4$ is equal to the voltage across resistor 5 plus the voltage $U_6$, it follows importantly that the voltage $U_6$ will tend to increase with increasing motor speed.

As the motor speed increases further, the induced motor EMF will further increase, and the armature current through resistor 5 will further decrease. Eventually, the induced EMF will very nearly approach the driving voltage $U_4$, substantially cancelling the driving voltage, so as to prevent further acceleration. The small difference between the final induced motor EMF and driving voltage $U_4$ will equal the small accelerating voltage necessary to overcome frictional forces, air resistance, and the load. The induced EMF will approximate to the driving voltage, the steady state is reached, and the motor will continue to run at fixed speed.

Now, with feedback resistor 7 inserted in the circuit, the operation is somewhat similar:

Initially, there is a sizable armature current, because of the low speed and low induced EMF, and thus a sizable accelerating torque. As the motor speed increases, the induced EMF increases, the voltage drop across resistor 5 tends to decrease, and so the armature current tends to decrease, as was previously the case without the feedback resistor 7. However, the feedback resistor 7 feeds back to inverting input 3 a voltage proportional to $U_6$. As just mentioned, any slight increase in motor speed produces a slight increase in $U_6$. Accordingly, as the motor speed increases, the voltage at input 3 increases, and the voltage at output 4 decreases. Thus, increasing motor speed results in increasing voltage $U_6$ and, contrary to the operation without feedback, decreasing of the driving voltage $U_4$. Eventually, the increasing EMF will almost meet with the decreasing driving voltage $U_4$, as the steady state is reached. The small difference between the lowered steady-state $U_4$ and the steady state motor induced EMF will be just sufficient to produce a torque which can overcome frictional forces and any mechanical load driven by the motor.

Consider now what happens when switch 31 is opened. Immediately the voltage at input 2 goes to zero. It is a well known characteristic of D.C. motors that they can be braked by disconnecting the driving voltage and permitting the rotating motor to act as a generator by presenting it with a load. The generator produces a current through that load, and in a very short time the angular energy of the motor is dissipated as electrical energy, and the motor comes to a halt. With the arrangement of FIG. 1, the braking action is vastly improved. When switch 31 is opened, the only voltage at the amplifier input is the speed-dependent voltage at input 3. At the instant the switch 31 is opened, the voltage across the motor will correspond approximately to the induced motor EMF, and the voltage at input 3 will be some fraction of such voltage. Since this speed-dependent voltage appears at the inverting input to the amplifier, the amplified voltage appearing at output 4 will have a polarity opposite to the polarity which $U_4$ had when the motor was being accelerated. Accordingly, a very substantial amplified braking voltage will be positively applied across the motor circuit. The motor 6 is brought to a halt much sooner than if the motor were halted simply by allowing generator current to flow. The forcefulness of the braking, and the quickness with which the motor 6 is brought to a halt, are very important advantages of the circuit arrangement shown in FIG. 1. It is also important to note at this point what has already been mentioned — namely, that the magnitude of voltage $U_6$ will increase with decreasing armature current and accordingly with increasing speed. Likewise, when generator current flows out of the motor during braking, the voltage $U_6$ will decrease with decreasing speed. This speed-dependency of voltage $U_6$ permits use of voltage $U_6$ as a speed-indicating damping feedback signal in the system of FIG. 3, described later.

It will be appreciated from the foregoing description, that the feeding back of the motor voltage will result in a greatly reduced tendency to overshoot a commanded motor speed. Likewise, if the mechanical load on the motor varies, the feedback effect of the described circuit will tend to hold the motor speed constant.

Figure 2:
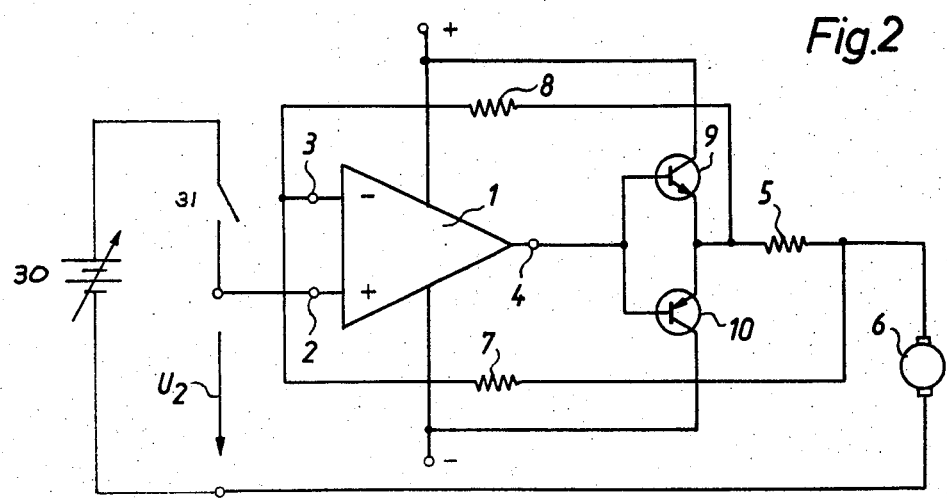
FIG. 2 is a circuit diagram of a second embodiment according to the invention.

The embodiment of FIG. 2 is similar to that of FIG. 1. In FIG. 2, however, it is assumed that the motor current may at times be too large to be supplied from the output of the subtracting amplifier itself. Accordingly, a push-pull power amplifier stage, including transistors 9, 10, is provided. Accordingly, the current flowing out of amplifier output 4 does not actually drive or brake motor 6, but instead controls the conductivity of power-supplying transistors 9, 10, which are better suited to handle the sizable current involved.

Figure 3:
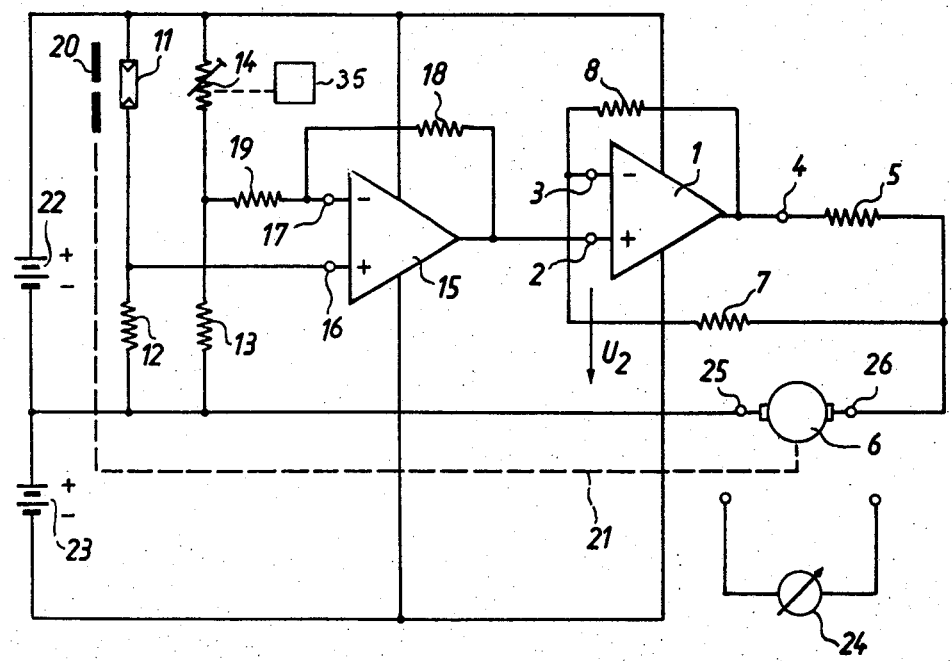
FIG. 3 is a circuit diagram of a third embodiment according to the invention.

In the embodiment of FIG. 3, the arrangement of FIG. 1 is employed to effect a damping of position follow-up response. It will be noted that components similar to those of FIG. 1 are present in the right-hand half of the FIG. 3 circuit, and are identified with the same reference numerals. In FIG. 3, motor 6 is mechanically coupled with and moves a movable controlled component 20, which in this embodiment is the iris diaphragm of a still or motion-picture camera.

In FIG. 3, the adjustable command means 30 of FIG. 1 is replaced by a more complex command system. It is the purpose of the FIG. 3 circuit to automatically adjust the size of the diaphragm opening so that the amount of light permitted to pass through the diaphragm is always equal to a predetermined value.

The command means of FIG. 3 includes an additional differential operational amplifier 15 having a non-inverting input 16 and an inverting input 17, and an output. A conventional feedback resistor 8 connects the output of the amplifier to the non-inverting input 17. A first voltage signal applied to input 17 depends on the relative magnitudes of resistors 13, 14, 19 as well as on the value of voltage source 22, and will be fixed for a particular value of voltage and for a particular value of and 14. Voltage applied to inverting input 17 corresponds to ad represents in electrical form the desired amount of light which is to be permitted to pass through aperture 20. As illustrated, resistor 14 is variable, permitting a variation in the reference voltage applied to amplifier input 17. Accordingly, variable resistor 14 forms part of reference-setting means in this embodiment. Advantageously, the reference-setting means also includes film-sensitivity selecting adjusting means 35 mechanically coupled with and controlling the value of resistor 14.

A second voltage signal applied to amplifier input 16 is derived from the tap of a voltage divider formed of resistor 12 and photosensitive means 11, the resistance of means 11 being a function of the amount of light passing through aperture 20. In FIG. 3 the biasing for amplifiers 1 and 15 is schematically indicated. Components 11–18 form a transducer means according to the invention, and the transducer means in this embodiment has the form of comparing means.

The operation of the FIG. 3 circuit is a follows:

Assume that initially the amount of light passing through aperture 20 is exactly equal to the amount of light desired, as determined for instance on the basis of a particular film sensitivity, or some other consideration. In that event, the voltage at input 16 will be equal to the voltage at input 17. The voltage at the output of amplifier 15 will be zero. Thus, no driving voltage will be applied to terminal 2 of subtracting amplifier 1, and the motor 6 will not turn.

Assume now that the amount of light coming through aperture 20 suddenly changes by a considerable amount, for instance due to the sudden passing by of clouds. The resistance of photosensitive means 11 will change, as will accordingly the voltage at input 16. The voltages at inputs 16 and 17 will no longer be equal, and the output voltage of amplifier 15 will be non-zero. This non-zero output voltage will be applied to terminal 2 of subtracting amplifier 1 and, depending on the polarity of such voltage, the motor 6 will turn in one or the other direction, effecting an increase or decrease in the size of the aperture, as appropriate. When the aperture size has changed to an extent restoring the amount of entering light to the desired value, the signals at inputs 16, 17 will again be equal, so that the voltage at input 2 of amplifier 1 will again be zero, in the steady state.

It is important to consider how this servo operation is affected by provision of the circuit discussed previously in FIG. 1. It will be appreciated that the provision of such circuit arrangement effects a damping of the position-response — i.e., a reduced tendency to overshoot the desired aperture size and a reduced tendency to oscillate about the desired aperture size before finally settling at such aperture size in the steady state.

Why this damped response occurs in FIG. 3 should be clear from the previous discussion of FIG. 1. Assume that the amount of entering light is initially equal to the desired amount, but then changes suddenly. A command voltage is applied to input 2 and the speed-dependent voltage at input 3 is zero. Thus, the voltage at output 4 will correspond to voltage 2 in amplified form, and will create a very sizable accelerating torque for the motor 6. It is desirable that the initial accelerating torque be large, so as to make for a speedy response. However, if the accelerating torque were to continue to be large during the entire compensating motion of motor 6, the rotor of motor 6 would develop so much momentum that it would overshoot the desired angular orientation which corresponds to the appropriate aperture size. This would be the case even though the driving voltage would be zero when the rotor reaches the correct angular orientation.

However, such overshooting is greatly suppressed by the feeding back to input 3 of a speed-dependent damping signal corresponding to the voltage across motor 6. It was explained with regard to FIG. 1, that as the motor speed increases, the motor voltage will also increase, with the circuit according to the invention. Thus as the speed of motor 6 increases from zero due to the applied driving voltage at output 4, it becomes increasingly harder to further accelerate the motor. Thus, the motor will not develop so much momentum as to result in overshooting of the desired angular orientation of the rotor of motor 6.

In addition, while the voltage at input 3 is increasing because of increasing motor speed, the voltage at input 2 is decreasing because of the decreasing discrepancy between the actual and desired amounts of light. At some point before the motor reaches the angular orientation corresponding to the required aperture size, the voltage at input 3 will begin to exceed the voltage at input 2. At this point, braking action commences. Thus, braking of the motor commences before the motor actually reaches the proper angular orientation at which it should stop, and accordingly the tendency to overshoot the proper angular orientation is very much reduced.

This damping action is similar in substance to that accomplished when a speed-proportional damping signal is derived from a tachometer generator mechanically coupled to the motor. However, an advantageous feature of the invention is that the need for a costly tachometer generator is completely eliminated, because the motor is so connected with impedance 5 relative to output 4 that the same type of speed-dependent feedback signal may be provided, by using the transient motor voltage instead of a tachometer output voltage. Thus, the costly tachometer generator is in effect replaced by the simple resistor 7. Clearly this is the most advantageous of results.

In FIG. 3 there is also illustrated, as an alternative to the conventional D.C. motor 6 a galvanometer type instrument 24 which can effect position control in exactly the same manner as motor 6, in so far as the purposes of this embodiment are concerned. It is emphasized that the problem of overshooting and oscillatory response dealt with by the invention is present with motors other than conventional D.C. motors. Thus, the invention is no less applicable when motors of the sliding-magnetic core type, the just mentioned galvanometer type, and may other well known electromechanical types, are used. The replacement of rotary D.C. motor 6 by a motor of another electromechanical type need not be further explained, because the substitution is a simple matter easily accomplished by a mechanic familiar with the motor principles.

It will be understood that each of the elements described above, or two or more together, may also find a useful application in other types of constructions and circuit arrangements differing from the types described above.

While the invention has been illustrated and described as embodied in a regulating arrangement using a D.C. motor, it is not intended to be limited to the details shown, since various modifications and structural changes may be made without departing in any way from the spirit of the present invention.

The use of a difference amplifier for subtracting amplifier 1 is by no means absolutely necessary. It is desirable to have the output voltage at output 4 proportional to the difference of the input voltages at inputs 2 and 3. However, it is also possible to have the output voltage at 4 equal to a first factor times the voltage at one of the inputs minus a second factor at the other of the inputs. Mathematically expressed, the function of subtracting amplifier 1 can be to provide an output voltage $V_4 = aV_2 - bV_3$, where $V_2$ and $V_3$ are the respective input voltages at inputs 2 and 3. The factors $a$ and $b$ are preferably constant, and, when a difference amplifier is used, $a$ and $b$ are equal.

Furthermore, the circuitry of the invention is of course not limited in its usefulness to camera-diaphragm positioning systems, but is applicable to an immense variety of servomechanisms and other types of control systems.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A regulating arrangement comprising, in combination, subtracting amplifier means, having two inputs and an output, and operative for producing at said output a voltage equal to a first factor times the voltage at one of said inputs minus a second factor times the voltage at the other of said inputs; a motor circuit connected across said output of said subtracting amplifier means and comprising a motor having two motor terminals and also comprising impedance means including resistance means connected to one of said motor terminals in series with said motor and also connected to said output of said subtracting amplifier means, said impedance means being operative for carrying at least part of the motor current and enforcing across said motor terminals a voltage drop whose magnitude differs from the voltage drop across said output by at least the magnitude of the voltage drop across said impedance means and which increases in magnitude with decreasing motor current and accordingly with increasing motor speed; command means for applying to one of said inputs a voltage effecting desired motion of said motor; and feedback means connected to said one of said motor terminals and to the other of said inputs and operative for applying to the latter at least part of the voltage drop across said motor terminals.

2. An arrangement as defined in claim 1, wherein said substracting amplifier means comprises a differential amplifier, and wherein said first and second factors are equal.

3. An arrangement as defined in claim 4, wherein said differential amplifier comprises an operational amplifier.

4. An arrangement as defined in claim 1, wherein said motor is a rotary motor.

5. An arrangement as defined in claim 1, wherein said motor is a D.C. motor capable of unlimited rotation in a single direction.

6. An arrangement as defined in claim 1, wherein said motor comprises a galvanometer movement.

7. An arrangement as defined in claim 1, wherein the voltage applied to said one of said inputs by said command means is influenced by the voltage across said motor.

8. A regulating arrangement as defined in claim 1, wherein said feedback means includes feedback resistor means connected to said one of said motor terminals and to the other of said inputs and operative for applying to the latter at least part of the voltage drop across said motor terminals.

9. A regulating arrangement comprising, in combination, subtracting amplifier means comprising a differential amplifier having an inverting input, a non-inverting input and an output, and operative for producing at said output a voltage proportional to the difference between the voltages at said inverting and non-inverting inputs; a motor circuit connected across said output of said differential amplifier and comprising a motor, and impedance means connected with said motor and with said output for carrying at least part of the motor current and for enforcing a voltage drop across said motor of magnitude differing from the voltage magnitude across said output by at least the magnitude of the voltage drop across said impedance means and which increases in magnitude with decreasing motor current and accordingly with increasing motor speed; command means for applying to said non-inverting input a voltage effecting desired motion of said motor; and feedback means, connected to said motor and to said inverting input, for applying to the latter at least part of the voltage drop across said motor.

10. An arrangement as defined in claim 9, wherein said impedance means is connected in series with said motor.

11. An arrangement as defined in claim 2, wherein said impedance means comprises resistance means.

12. An arrangement as defined in claim 11, wherein said motor circuit comprises a power amplifier stage connected with said motor and with said output of said subtracting amplifier means.

13. An arrangement as defined in claim 12, wherein said power amplifier stage comprises a push-pull power amplifier.

* * * * *